US011816379B2

(12) United States Patent
Hojo

(10) Patent No.: US 11,816,379 B2
(45) Date of Patent: Nov. 14, 2023

(54) WORK ATTENDANCE MANAGEMENT SYSTEM

(71) Applicant: KYOCERA Document Solutions Inc., Osaka (JP)

(72) Inventor: Michiko Hojo, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/930,837

(22) Filed: Sep. 9, 2022

(65) Prior Publication Data

US 2023/0077985 A1    Mar. 16, 2023

(30) Foreign Application Priority Data

Sep. 10, 2021    (JP) .................................. 2021-147926

(51) Int. Cl.
*G06F 3/12*    (2006.01)
(52) U.S. Cl.
CPC ............ *G06F 3/1275* (2013.01); *G06F 3/126* (2013.01); *G06F 3/1222* (2013.01); *G06F 3/1274* (2013.01)
(58) Field of Classification Search
CPC ...... G06F 3/1275; G06F 3/1222; G06F 3/126; G06F 3/1274; G06F 3/1238; G06F 3/1239; G06F 3/1267; G06F 3/1285; Y02P 90/30

See application file for complete search history.

(56) References Cited

U.S. PATENT DOCUMENTS

2016/0150125 A1 *  5/2016  Yano ................... H04N 1/4413
                                                358/1.14
2017/0075635 A1 *  3/2017  Maemura .............. G06F 3/1285

FOREIGN PATENT DOCUMENTS

JP          2009116658 A      5/2009

* cited by examiner

*Primary Examiner* — Huo Long Chen
(74) *Attorney, Agent, or Firm* — Alleman Hall Creasman & Tuttle LLP

(57) ABSTRACT

A server includes an information storage portion, an application reception portion, and a transmission portion. The application reception portion receives a work application for work desired by a user. The transmission portion transmits identification information and work information of the user to a printing device. The printing device includes a storage portion, a user identification portion, a work hours determination portion, an end time determination portion, and a deletion portion. The storage portion stores information transmitted from the server. The user identification portion identifies the user that is logging in. The work hours determination portion determines whether the date and time of login is within work hours. The end time determination portion determines whether the current time is after the work end time. The deletion portion deletes information corresponding to the user from the storage portion when the current time is after the work end time.

4 Claims, 6 Drawing Sheets

FIG.2

| USER NAME | USER ID | PASSWORD | |
|---|---|---|---|
| ○○ ○○ | ＊＊＊＊ | ＊＊＊＊ | L01 |
| △△ △△ | ＊＊＊＊ | ＊＊＊＊ | L02 |
| ⋮ | ⋮ | ⋮ | |

FIG.3

WORK INFORMATION OF △△ △△

| WORK DATE | WORK START/END TIME | WORK PATTERN | WORK OFFICE | |
|---|---|---|---|---|
| AUGUST 2, 2021 | 09:00 a.m.– 06:00 p.m. | DAY SHIFT | HEAD OFFICE | L82 |
| AUGUST 3, 2021 | 09:00 a.m.– 06:00 p.m. | DAY SHIFT | HEAD OFFICE | L83 |
| AUGUST 4, 2021 | 09:00 a.m.– 06:00 p.m. | DAY SHIFT | HEAD OFFICE | L84 |
| AUGUST 5, 2021 | 09:00 a.m.– 06:00 p.m. | DAY SHIFT | HEAD OFFICE | L85 |

FIG.4

SATELLITE OFFICE PRINTING DEVICE INFORMATION

| MODEL NAME | HOST NAME | IP ADDRESS | INSTALLATION LOCATION | |
|---|---|---|---|---|
| Printer-A | 03-P01 | 192.0.0.1 | EAST SIDE | L31 |
| Printer-A | 03-P02 | 192.0.0.2 | NORTH SIDE | L32 |

WORK ATTENDANCE MANAGEMENT SYSTEM

INCORPORATION BY REFERENCE

This application is based upon and claims the benefit of priority from the corresponding Japanese Patent Application No. 2021-147926 filed on Sep. 10, 2021, the entire contents of which are incorporated herein by reference.

BACKGROUND

The present disclosure relates to a work attendance management system.

In a work attendance management system, user identification is required. A user authentication system is an example of a system that identifies a user. The user authentication system includes a plurality of multifunction peripherals and an authentication device connected by a network. For example, a conventional user authentication system, by executing an authentication information deletion program, deletes user identification information (ID information) based on the communication status between the multifunction peripheral and the authentication device.

SUMMARY

A work attendance management system according to the present disclosure includes a server and one or more printing devices. The server can be accessed by users. The printing device can be accessed by the user and the server. The server includes an information storage portion, an application reception portion, and a transmission portion. The information storage portion stores identification information and work information of the user. The application reception portion receives an application from the user for a work location and work date desired by the user. The transmission portion transmits the identification information of the user who applied and the work information for the work date applied for to one of the printing devices installed at the work location applied for. The printing device includes a storage portion, a user identification portion, a work hours determination portion, an end time determination portion, and a deletion portion. The storage portion stores the identification information and the work information transmitted from the transmission portion. The user identification portion identifies the user attempting to log in to the printing device based on the identification information stored in the storage portion. The work hours determination portion determines whether the date and time of the attempted login is within work hours on the work date in the work information stored in the storage portion. an end time determination portion determines whether a current time is after a work end time on the work date in the work information stored in the storage portion; and a deletion portion deletes the identification information and the work information stored in the storage portion in a case where the end time determination portion determines that the current time is after the work end time.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 is a table showing user identification information.

FIG. 3 is a table showing user work information.

FIG. 4 is a table showing printing device information of a satellite office.

DETAILED DESCRIPTION

Figure 1:
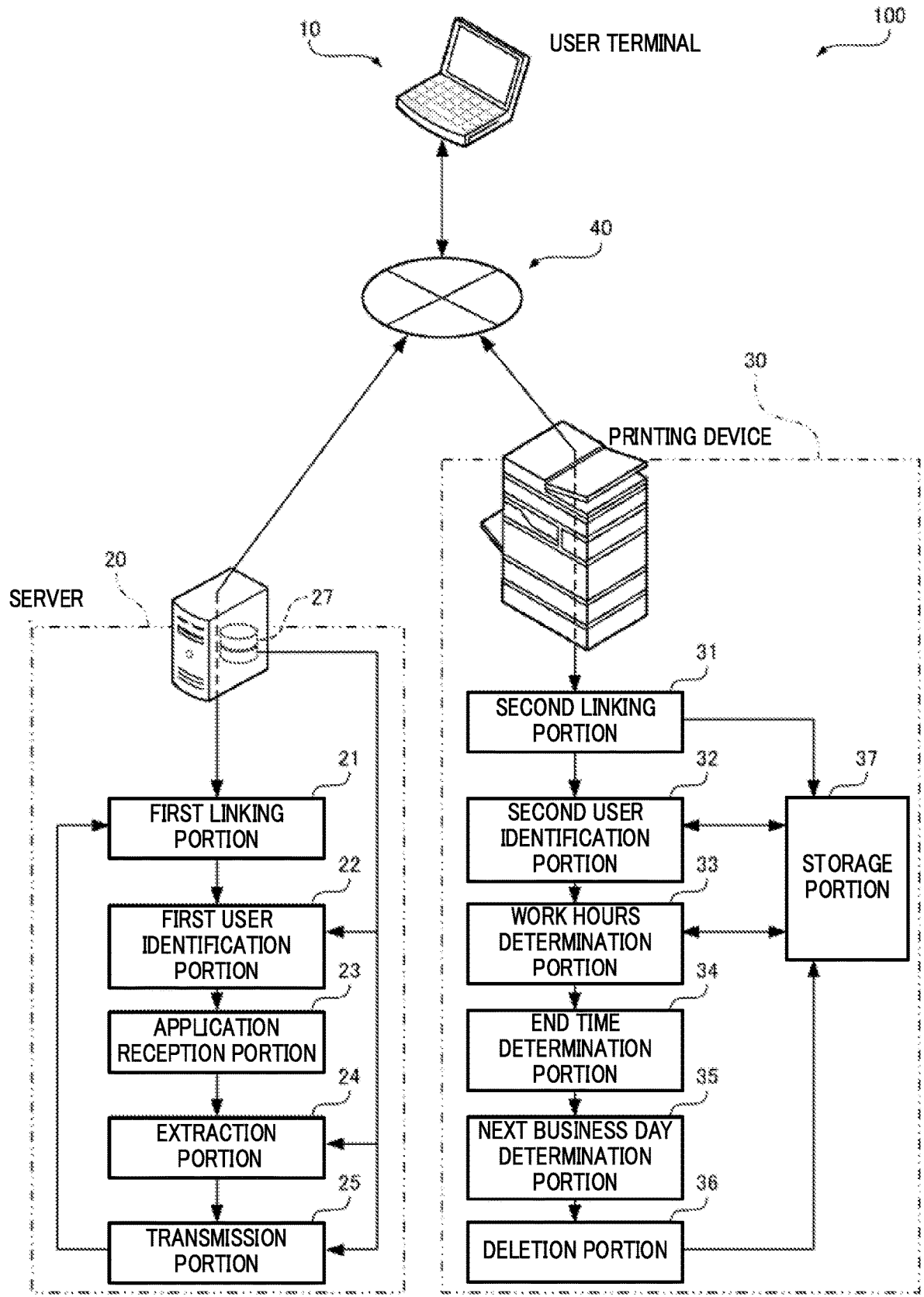
FIG. 1 is a configuration diagram showing a work attendance management system according to an embodiment of the present disclosure.

Conventional user authentication systems may in some cases determine whether or not to delete user ID information based on the number of login authentications and whether or not there is a printing process, in addition to the communication status between the multifunction peripheral and the authentication device. In such a case, the timing for deleting the user ID information is not always appropriate.

A work attendance management system 100 according to an embodiment of the present disclosure will be described below with reference to the drawings. Note that in each figure, the same reference numerals are given to the same or corresponding parts.

An embodiment of a work attendance management system 100 according to the present disclosure will be described with reference to FIG. 1 to FIG. 8. The work attendance management system 100 has a function for deleting unnecessary information at an appropriate time.

As shown in FIG. 1, the work attendance management system 100 includes a server 20 and one or more printing devices 30. In the present embodiment, the work attendance management system 100 also includes one or more user terminals 10.

The server 20 can be accessed by a user via a user terminal 10. The server 20 is, for example, a computer installed at a head office of an organization to which the user belongs.

The printing device 30 is installed, for example, at a satellite office of the organization to which the user belongs. Note that the server 20 and the printing device 30 are located at different locations. Here, a different location is, for example, a different work location.

The user terminal 10, server 20, and printing device 30 may be connected in any way as long as they are accessible to each other. In the present embodiment, the user terminal 10, the server 20 and the printing device 30 are, for example, connected by a communication network 40 such as the Internet.

The user terminal 10 is shown as a laptop personal computer in FIG. 1. However, the user terminal 10 may be another terminal such as a desktop personal computer, a mobile phone, or a smartphone. In addition, only one user terminal 10 and one printing device 30 are shown in FIG. 1.

However, the work attendance management system 100 may include a plurality of user terminals 10 and a plurality of printing devices 30.

The server 20 includes an information storage portion 27, a first linking portion 21, a first user identification portion 22, an application reception portion 23, an extraction portion 24, and a transmission portion 25.

The information storage portion 27 includes a storage device and stores computer programs, data, and the like. More specifically, the information storage portion 27 includes a main storage device and an auxiliary storage device. The main storage device is a semiconductor memory or the like. The auxiliary storage device includes one or more of a semiconductor memory, a solid state drive, and a hard disk drive.

The auxiliary storage device includes a non-volatile memory. The non-volatile memory is, for example, Electrically Erasable Programmable Read-Only Memory (EE-PROM) (registered trademark). The information storage portion 27 may include removable media.

In addition, the information storage portion 27 stores identification information and work information of the user, and printing device information of the work location. As shown in FIG. 2, the identification information includes, for example, a user name, a user ID, and a password.

As shown in FIG. 3, the work information includes information indicating the user's work schedule. The work information includes, for example, information indicating each user's work dates, work start times, work end times, work patterns, and work locations. The work location is an office where the user works. For example, the work location may be a head office or a satellite office.

As shown in FIG. 4, the printing device information of the work location includes information indicating the model name, host name, IP address and installation location of the printing device 30 arranged at each work location. FIG. 4 shows an example where the work location is a satellite office.

As shown in FIG. 1, the first linking portion 21 links the user terminal 10 and the printing device 30 via a communication network 40. The link adopted is, for example, Active Directory (registered trademark). Active Directory provides a directory service. A directory as a network term means a container for storing information of network objects.

A user account that the user uses to log in, a computer account of a computer that the user uses, a shared folder for sharing files on the computer, and a printer that the user uses to print to via the network are all included in the objects of the Active Directory.

The directory service is a service that enables administrators and users to use information in the directory. By providing the directory service, it is possible to search for and access the network objects, and to centrally manage the network objects.

The first user identification portion 22 identifies a user attempting to log in to the server 20 from the user terminal 10 based on identification information stored in the information storage portion 27. More specifically, for example, in a case where the first user identification portion 22 determines that the user ID and password entered by the user respectively match the user ID and password stored in the information storage portion 27, the first user identification portion 22 determines that the user has been identified. When the first user identification portion 22 determines that the user has been identified, the first user identification portion 22 allows the user to log in to the server 20.

The application reception portion 23 receives applications for a desired work location and work date from a user who is allowed to log in to the server 20. The user's desired work location is, for example, a satellite office. In a case where the organization to which the user belongs has a plurality of satellite offices, the user's desired work location is, for example, one of the plurality of satellite offices.

Figure 5:
FIG. 5 is a diagram showing an operation screen for applying for a work date and a work location desired by a user.

In the example shown in FIG. 5, the plurality of satellite offices of the organization to which the user belongs includes a first satellite office, a second satellite office and a third satellite office. In this case, the user's desired work location is, for example, any one of the first satellite office to the third satellite office. In the example shown in FIG. 5, the work dates desired by the user are from Aug. 2, 2021 to Aug. 4, 2021.

The extraction portion 24 extracts the information for the work dates applied for from the work information of the user who is allowed to log in to the server 20. The extracted work information includes information on the work start time, the work end time, the work pattern, and the work location. The extracted work information is information before an application.

In the example shown in FIGS. 3 and 5, the work location of the extracted work information is the head office and the work location applied for is a satellite office, so they are different. Therefore, the server 20 overwrites the work location of the work information before the application with the work location applied for.

More specifically, in the example shown in FIG. 3, before the application is made, the work location of the work information L82 to L84 corresponding to the work dates of Aug. 2, 2021 to Aug. 4, 2021 is the "head office".

On the other hand, in the example shown in FIG. 5, the work location applied for is the "third satellite office". Therefore, the server 20 overwrites the work locations of the work information L82 to L84 shown in FIG. 3 from "head office" to "third satellite office".

The extraction portion 24 transmits to the transmission unit 25 the identification information of the user who applied, the extracted and overwritten work information, and the printing device information of the work location applied for to the transmission portion 25.

The transmission portion 25 processes the information transmitted from the extraction portion 24. More specifically, the transmission portion 25, via a first linking portion 21, transmits the identification information and work information of the user transmitted from the extraction portion 24 to the printing device 30 corresponding to the printing device information of the third satellite office transmitted from the extracting unit 24.

Information transmitted by the transmission portion 25 includes, for example, identification information L02 shown in FIG. 2 and work information L82 to L84 shown in FIG. 3. For example, the transmission portion 25 transmits identification information and work information of the user transmitted from the extraction portion 24 to two printing devices L31 and L32 of the satellite office applied for as shown in FIG. 4.

As shown in FIG. 1, the printing device 30 includes a second linking portion 31, a storage portion 37, a second user identification portion 32, a work hours determination portion 33, an end time determination portion 34, a next business day determination portion 35, and a deletion portion 36.

The second linking portion 31 links the user terminal 10 and the first linking portion 21 of the server 20 via the communication network 40. The link adopted is, for example, Active Directory (registered trademark).

The configuration of the storage portion 37 is the same as the configuration of the information storage portion 27 of the server 20. The storage portion 37 stores information transmitted from the transmission portion 25 of the server 20, for example. Thus, the information transmitted from the transmission portion 25 of the server 20 is registered in the storage portion 37. That is, the information registered in the storage portion 37 includes identification information and work information of the user who applied to the server 20.

The second user identification portion 32 identifies a user attempting to log in to the printing device 30 from the user terminal 10 based on identification information registered in the storage portion 37. The second user identification portion 32, for example, determines whether or not the user ID and password entered by the user respectively match the user ID and password registered in the storage portion 37.

That is, the second user identification portion 32 determines whether or not the user attempting to log in to the printing device 30 is the user who has applied to work at the satellite office where the printing device 30 is located.

The second user identification portion 32 determines that the user has been identified in a case where it is determined that the user attempting to log in to the printing device 30 is the user who applied to work at the satellite office where the printing device 30 is located.

The work hours determination portion 33 determines whether or not the date and time when the user attempts to log in to the printing device 30 is within the work hours on the work date in the registered work information. In a case where the second user identification portion 32 identifies the user attempting to log in, and the work hours determination portion 33 determines that the date and time of the login is within the work hours, the user is allowed to log in to the printing device 30. Active Directory (registered trademark) authentication is adopted for authenticating the user's login to the printing device 30.

The printing device 30 allows a user that is allowed to log in to the printing device 30 to use the storage portion 37. A user who is allowed to log in can cause the printing device 30 to execute jobs corresponding to various functions.

For example, a user who is allowed to log in can cause the printing device 30 to execute the jobs which create a user box in the storage portion 37, and create and store information for office work such as documents in the user box. The user box is a user-only directory for the user who is allowed to log in.

On the other hand, in some cases, logging into the printing device 30 may not be allowed due to reasons such as being outside the work hours. A user who is not allowed to log in cannot cause the printing device 30 to execute processing such as storing information for office work such as documents in the storage portion 37. Therefore, accumulation of unnecessary information in the printing device 30 is suppressed. In addition, a user who is allowed to log in can cause the printing device 30 to print or transmit information.

The end time determination portion 34 determines whether or not the current time is after the work end time on the work date in the registered work information.

The deletion portion 36 deletes information stored in the storage portion 37. When the end time determination portion 34 determines that the current time is after the work end time on the work date in the registered work information, the deletion portion 36 executes a deletion process.

In the deletion process, the deletion portion 36 deletes the identification information and work information of the user, and information for office work from the storage portion 37. The information for office work includes the user box and documents stored in the user box.

That is, in the present embodiment, the information stored in the storage portion 37 includes, for example, information for office work such as a user box and documents stored in the user box.

The next business day determination portion 35 determines whether or not the work date in the registered work information also includes the next business day. The next business day determination portion 35 does not allow the deletion portion 36 to delete the information stored in the storage portion 37 when it is determined that the next business day is included in the work dates in the work information registered in the storage portion 37.

By the next business day determination portion 35 not allowing the deletion portion 36 to perform deletion, the same user can perform the same work on the next business day. That is, when the same user logs in to the same printing device 30 on the next business day, information for office work such as the user box and documents stored in the storage portion 37 can be used by the same user even on the next business day.

Figure 6:
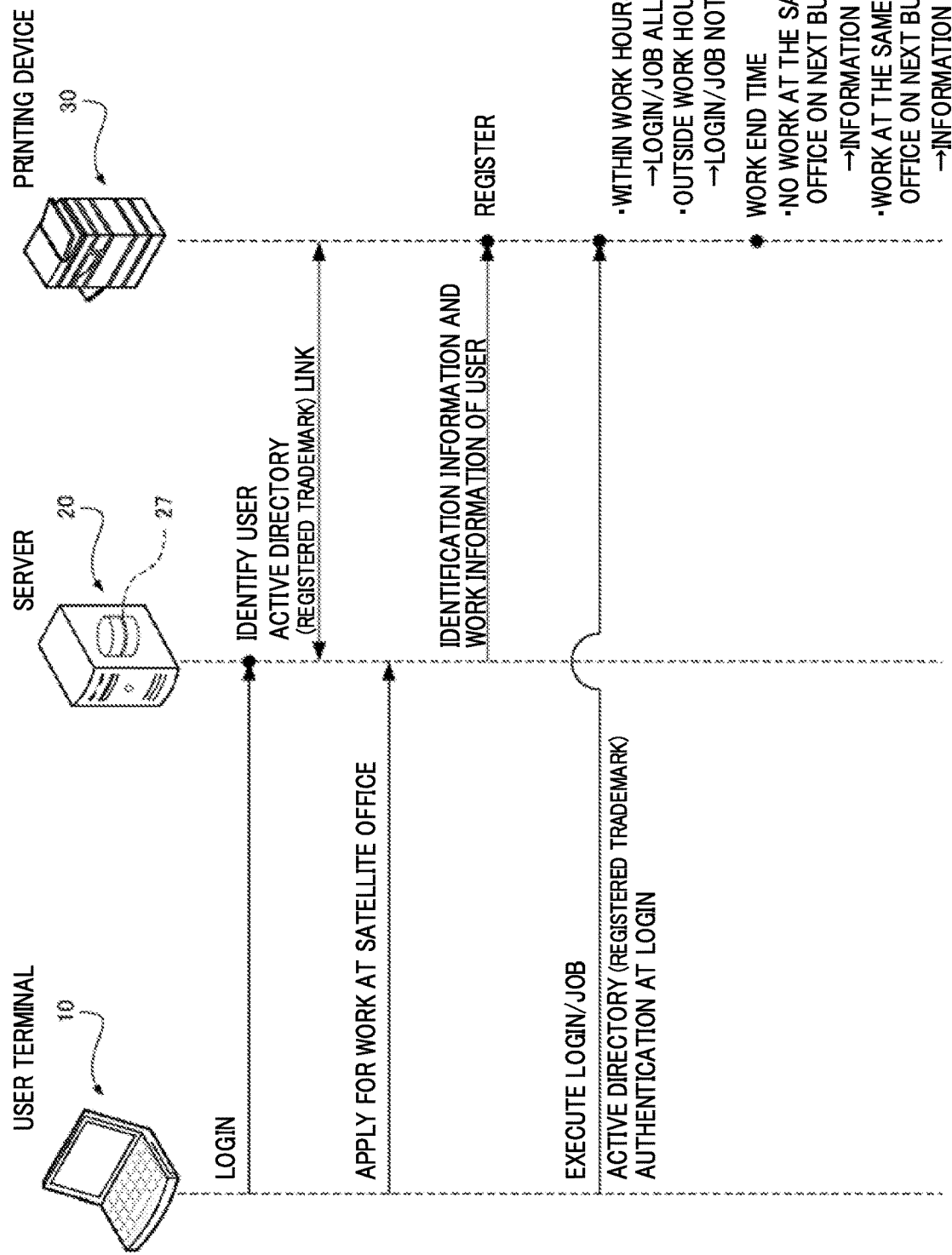
FIG. 6 is a correlation diagram showing flow between a user terminal, a server, and a printing device.

A correlation of the flows in the user terminal 10, the server 20, and the printing device 30 will be described below with reference to FIG. 6.

A user attempts to log in to the server 20 from the user terminal 10. The server 20, based on the identification information stored in the information storage portion 27, executes processing for identifying the user attempting to log in to the server 20. In a case where the server 10 is able to identify the user, the server 10 allows the user to log in.

The user who is allowed to log in applies from the user terminal 10 for a desired satellite office and work date. The server 20 transmits the identification information of the user who applied and the work information for the work date applied for to the printing device 30 applied for. The printing device 30 registers the information transmitted from the server 20 in the storage portion 37.

The user operates the user terminal 10 and attempts to log in to the printing device 30 of the satellite office where the user applied to work. The printing device 30 of the satellite office executes processing for identifying the user attempting to log in based on the identification information registered in the storage portion 37.

The printing device 30 of the satellite office allows the user to log in when the printing device 30 can identify the user attempting to log in and the date and time of the login attempt are within the work hours on the work date registered in the storage portion 37. On the other hand, the printing device 30 does not allow the user's login when the date and time of the log in attempt is outside the work hours on the work date registered in the storage portion 37.

The user who was allowed to log in is able to cause the printing device 30 to execute the jobs corresponding to various functions. The jobs include, for example, a print job to form images on sheets. The print job is stored, for example, in the storage portion 37.

When the current time is after the work end time, and the next business day is not a work date at the same satellite office, the information corresponding to the user allowed to log in is deleted from the storage portion 37. More specifically, the information to be deleted includes the identification information and work information of the user, as well as information for office work such a user box and documents stored in the user box.

On the other hand, when the current time is after the work end time, and the next business day is a work date at the same satellite office, the information corresponding to the user allowed to log in is not deleted from the storage portion 37. More specifically, the information not to be deleted includes the identification information and work information of the user, as well as information for office work such a user box and documents stored in the user box.

Processing flow in the work attendance management system 100 will be described below with reference to the flowcharts shown in FIG. 7 and FIG. 8.

Figure 7:
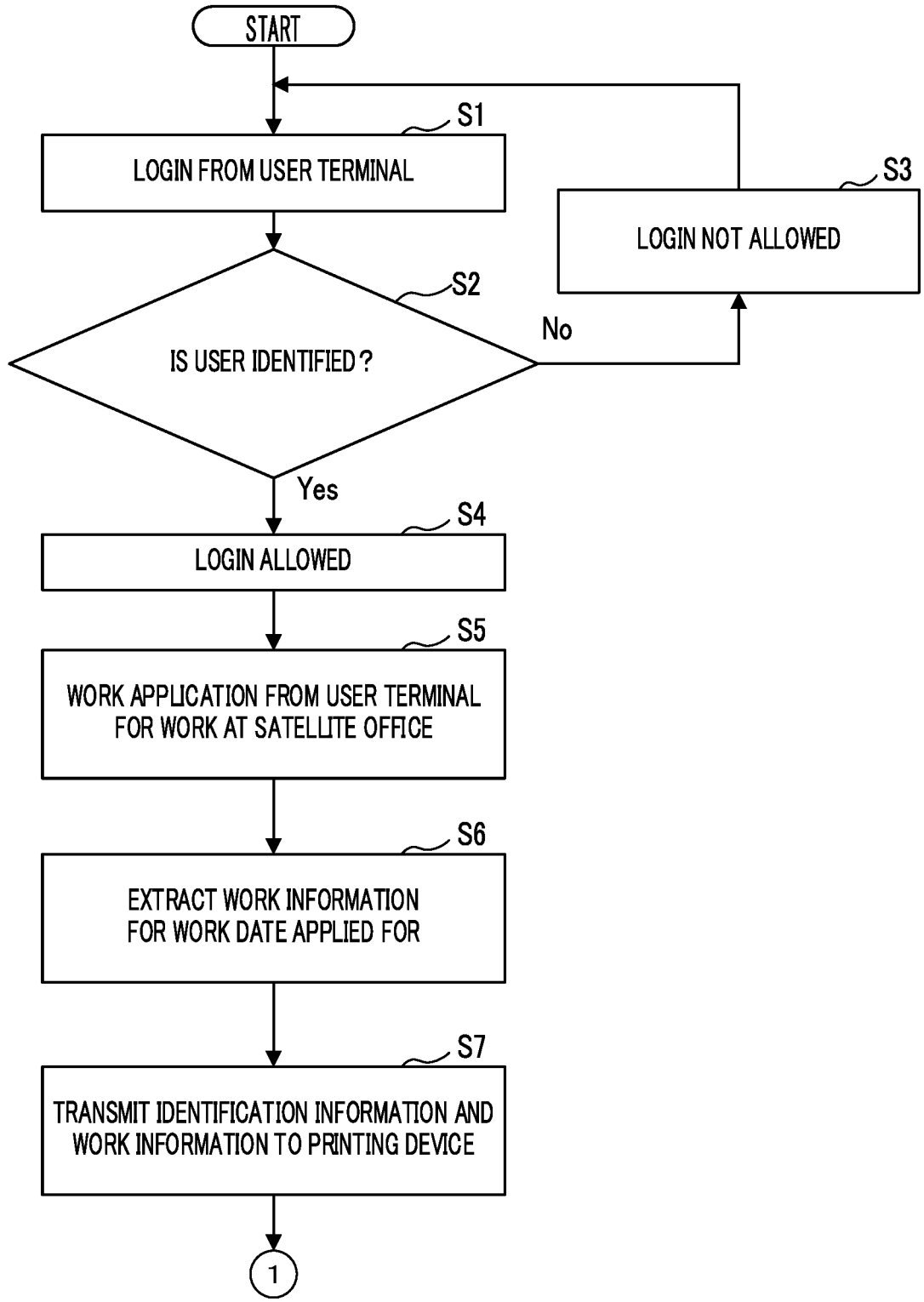
FIG. 7 is a flowchart showing operation of the server.

The flowchart shown in FIG. 7 shows processing by the server 20. On the other hand, the flowchart shown in FIG. 8 shows processing by the printing device 30.

As shown in FIG. 7, the first user identification portion 22 recognizes a login attempt by the user from the user terminal 10 (step S1). Further, the first user identification portion 22 identifies the user.

In a case where the user cannot be identified, the first user identification portion 22 does not allow the user to log in to the server 20 (steps S2 and S3). On the other hand, in a case where the user can be identified, the first user identification portion 22 allows the user to log in to the server 20 (steps S2 and S4).

A user who is allowed to log in applies for work at a desired satellite office from the user terminal 10 (step S5). As a result, the application reception portion 23 receives the user's application for work at the satellite office.

When the application reception portion 23 receives an application for a desired satellite office and work date from the user, the extraction portion 24 extracts work information for the work date applied for (step S6).

The transmission portion 25 transmits the identification information of the user who has applied for work at the satellite office and the extracted work information for the work date to the printing device 30 of the satellite office to which the work has been applied for (step S7).

Figure 8:
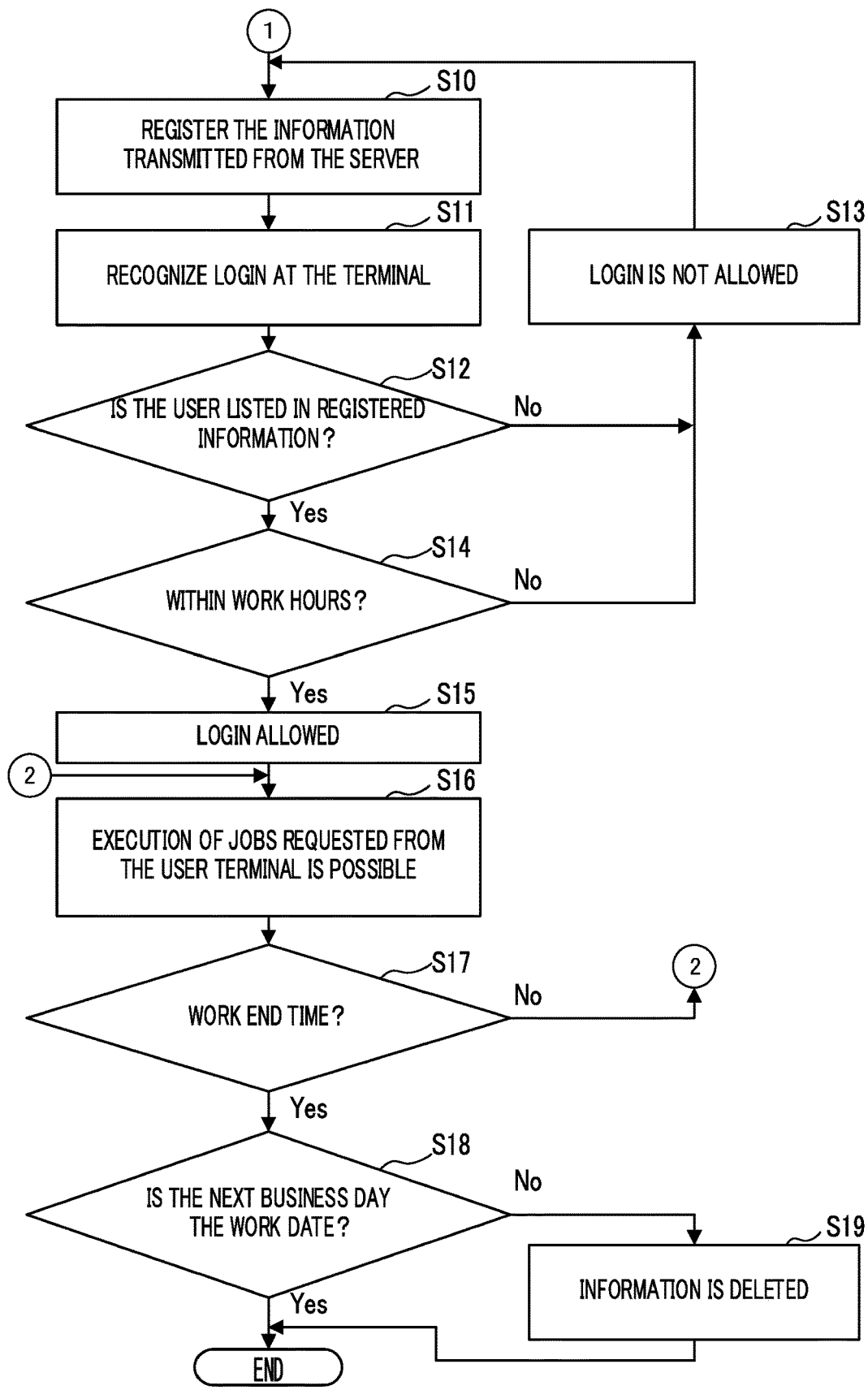
FIG. 8 is a flowchart showing operation of the printing device.

As shown in FIG. 8, the printing device 30 receives information transmitted from the server 20 and registers the received information in the storage portion 37 (step S10). After that, the second user identification portion 32 recognizes the attempted login at the user terminal 10 (step S11).

In a case where the identification information of the user received by the printing device 30 does not match any of the identification information registered in the storage portion 37, that is, in a case where identification information of the user is not registered in the storage portion 37, the second user identification portion 32 does not allow the user to log in to the printing device 30 (steps S12 and S13).

On the other hand, in a case where the identification information of the user received by the printing device 30 matches any of the identification information registered in the storage portion 37, that is, in a case where the identification information of the user is registered in the storage portion 37, the work hours determination portion 33 executes a time determination process (steps S12 and S13).

That is, in a case where the work hours determination portion 33 determines in the time determination process that the date and time when the user attempts to log in is outside the work hours on the work date, the work hours determination portion 33 does not allow the user to log in to the printing device 30 (steps S14 and S13). That is, the work hours determination portion 33 does not allow the user to log in to the printing device 30 in a case where the date and time when the user attempts to log in is not between the work start time and the work end time in the work information (step S13).

In a case where the work hours determination portion 33 determines in the time determination process that the date and time when the user attempts to log in is within the work hours on the work date, the work hours determination portion 33 allows the user to log in to the printing device 30 (steps S14 and S15). That is, the work hours determination portion 33 allows the user to log in to the printing device 30 in a case where the date and time when the user attempts to log in is a time between the work start time and the work end time in the work information (step S15).

The printing device 30 can execute the jobs corresponding to various functions in response to a request from the user terminal 10 corresponding to the user that is allowed to log in (step S16).

After login is allowed, when the current time is after the work end time, the next business day determination portion 35 executes the next day determination process (step S18).

In a case where the next business day determination portion 35 determines in the next day determination process that the next business day is not the work date of the user at the same satellite office, the deletion portion 36 deletes the information corresponding to the user stored in the storage portion 37 (steps S18 and S19).

On the other hand, in a case where the next business day determination portion 35 determines in the next day determination process that the next business day is the work date of the user at the same satellite office, the deletion portion 36 does not delete the information corresponding to the user stored in the storage portion 37 (YES in steps S18).

By adopting the work attendance management system 100 as described above, unnecessary information stored in the printing device 30 of the satellite office is deleted after the work end time on the work date at the satellite office. Thus, information determined to be unnecessary in relation to work location, work date and work hours is deleted at an appropriate time.

In addition, in a case where the next business day is the work date of the user at the same satellite office, the information corresponding to the user stored in the satellite office printing device 30 is not deleted. Thus, information that is no longer needed is deleted in a timelier manner.

An embodiment of the technique according to the present disclosure has been described above with reference to the drawings. However, the technique according to the present disclosure is not limited to the embodiment described above, and can be embodied in various aspects without departing from the scope of the present disclosure. In order to make the drawings easier to understand, the drawings mainly show each component schematically, and the thicknesses, lengths, numbers, spacing, and the like of each component shown in the figures may differ from the actual ones for the convenience of making the drawings. In addition, the speed, material, shape, size, and the like of each component shown in the embodiment described above are examples and are not particularly limited, and various changes can be made within a range that does not substantially deviate from the configuration of the present disclosure.

In the embodiment, a case where the server 20 is installed at the head office has been described as an example. However, the server 20 may be installed at a location different from the head office. The server 20 may, for example, be installed at a location other than the head office, such as a branch office, a branch store, or a sales office, or may be arranged on the cloud.

In addition, in the embodiment, it has been described that the server 20 includes the extraction portion 24. However, the server 20 does not have to include the extraction portion 24. In a case where the server 20 does not include the extraction portion 24, the server 20 does not extract information corresponding to the work date applied for by the user from the work information, and the work information stored in the information storage portion 27 is transmitted to the printing device 30 as is.

Furthermore, in the embodiment, an example has been described in which the next business day determination portion 35 uses the next business day as a determination criterion. However, the next business day and the business day after the next business day may be used as determination criteria. That is, in a case where at least one of the next business day and the business day after the next business day is a work date of the user at the same satellite office, the information stored in the storage portion 37 of the printing device 30 of the satellite office is not deleted. As a result, in cases such as when the user takes a vacation on the next business day and works at the same satellite office on the business day following the next business day, the information is not deleted. Thus, information that is no longer needed is deleted in a timelier manner.

The technique according to the present disclosure can be used in the field of image processing apparatuses and has industrial applicability.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A work attendance management system, comprising:
a server that can be accessed by a user; and
one or more printing devices that can be accessed by the user and the server; wherein
the server includes:
an information storage portion configured to store identification information and work information of the user;
an application reception portion configured to receive an application from the user for a work location and a work date desired by the user; and
a transmission portion configured to transmit the identification information of the user who applied and the work information of the work date applied for to one of the printing devices installed at the work location applied for;
the printing device includes:
a storage portion configured to store the identification information and the work information transmitted from the transmission portion;
a user identification portion configured to identify the user attempting to log in to the printing device based on the identification information stored in the storage portion;
a work hours determination portion configured to determine whether a date and time of the attempted login is within work hours on the work date in the work information stored in the storage portion;
an end time determination portion configured to determine whether a current time is after a work end time on the work date in the stored work information; and
a deletion portion configured to delete the identification information and the work information stored in the storage portion in a case where the end time determination portion determines that the current time is after the work end time.

2. The work attendance management system according to claim 1, wherein
the printing device, in a case where the user is identified by the user identification portion, and the work hours determination portion determines that the date and time of the login is within the work hours, allows creation and storage of information in the storage portion corresponding to the identified user.

3. The work attendance management system according to claim 2, wherein
the deletion portion, in a case where the end time determination portion determines that the current time is after the work end time, the deletion portion deletes information created or stored in the storage portion corresponding to the identified user.

4. The work attendance management system according to claims 1, wherein
the printing device further includes a next business day determination portion configured to determine whether the work date in the stored work information includes the next business day; and
the next business day determination portion, in a case where the work date includes the next business day, does not cause the deletion portion to delete information corresponding to the identified user.

* * * * *